United States Patent [19]
Dale et al.

[11] Patent Number: 4,983,128
[45] Date of Patent: Jan. 8, 1991

[54] BUS BAR FOR MAKING ELECTRICAL TAPS

[75] Inventors: James L. Dale; Vernon R. Miller, both of Atlanta; Lincoln E. Roberts, Decatur, all of Ga.

[73] Assignee: AMP Incorporated, Harrisburg, Pa.

[21] Appl. No.: 399,740

[22] Filed: Aug. 28, 1989

[51] Int. Cl.$^5$ ............................................. H01R 27/02
[52] U.S. Cl. .................................... 439/214; 439/111
[58] Field of Search ........................ 439/214, 111, 497

[56] References Cited

U.S. PATENT DOCUMENTS

| | | | |
|---|---|---|---|
| 2,175,245 | 10/1939 | Brockman | 439/111 |
| 3,112,195 | 11/1963 | Swengel | 339/17 |
| 4,002,388 | 1/1977 | Menocal | 339/22 B |
| 4,313,646 | 2/1982 | Millhimes et al. | 339/156 R |
| 4,387,949 | 6/1983 | Haitmanek | 339/125 R |
| 4,479,692 | 10/1984 | Greenwood et al. | 339/99 R |
| 4,589,715 | 5/1986 | Weisenburger | 339/17 F |
| 4,655,515 | 4/1987 | Hamsher | 439/497 X |
| 4,740,167 | 4/1988 | Millhimes et al. | 439/92 |
| 4,915,650 | 4/1990 | Daly et al. | 439/498 |

OTHER PUBLICATIONS

Electri.Onics, Jun. 1984, "Bus Bars for PCB Applciations Keyed to Design, Perfrmance", pp. 23-26.

*Primary Examiner*—Eugene F. Desmond
*Attorney, Agent, or Firm*—William B. Noll; Robert W. Pitts

[57] ABSTRACT

Electrical connecting device such as a bus bar comprises a folded section of sheet metal having a bight and arms extending from the bight. Receptacle portions are provided in the form of openings in the bight so that a tab contact can be inserted into one of the openings and will engage the opposed internal surfaces of the arms. In addition, contact sites are provided on the distal ends of the arms for contacting the devices which have wire-receiving slots on their ends. A conductor in a cable can thus be connected to a plurality of second conductors which are attached to the tab members that are inserted into the receptacle portions in the bight.

22 Claims, 9 Drawing Sheets

BUS BAR FOR MAKING ELECTRICAL TAPS

FIELD OF THE INVENTION

This invention relates to bus bars and particularly to a bus bar which has contact sites and/or receptacle sites which are adapted to receive male contact members or other electrical contacts which in turn are connected to wires or other conductors.

BACKGROUND OF THE INVENTION

It is frequently necessary commonly to connect a plurality of conductors and a wide variety of connecting devices are available for that purpose For example, it is common practice to use a commoning block which has contact sites that are adapted to receive terminals on the ends of the conductors which are to be commonly connected. Most of the connecting devices of the commoning block type require that all of the terminals which are connected to the block be of the same configuration and such devices are incapable of accepting different types of electrical contact members.

Many conventional duplex outlets used with 110 volt wires employ bus bars to interconnect both duplex sockets to the wiring. For example, U.S. Pat. No. 4,387,949 and U.S. Pat. No. 4,479,692 show duplex receptacle outlets used with standard three wire undercarpet flat power cable containing hot, neutral and ground conductors. U.S. Pat. No. 4,589,715 discloses an electrical connector kit for making alternate interconnection to the five wire flat undercarpet power cable. Bus bars are also used in conventional pre-wired electrical A/C outlet strips which employ bus bars to make a number of interconnections. For example, a single bus bar may include four interconnection sites for one conductor in a conventional pre-wired strip and the bus bar may be attached to a switch by disconnectable tab receptacles. However, these conventional bus bars are not suitable for making a number of interconnections to closely spaced conductors, such as wires in a ribbon cable, because the bus bars are relatively large and the contacts used to make the interconnections are relatively bulky. For example, the conductors in flat undercarpet cable are much wider than wires capable of carrying equivalent currents. Therefore, wider contacts can be employed for both input and output from the bus bar. Use of these bus bar configurations for round wires in ribbon cables would mean that the centerline spacing between conductors must be greater than necessary for electrical distribution requirements, or would require that the centerline spacing be changed at cable locations where an outlet or a tap is to be placed. Furthermore, these conventional configurations are not suitable for use with signal wires, which are smaller and can be placed on even closer centerline spacings.

THE INVENTION

The invention comprises an electrical connecting device having at least one receptacle portion which is intended to receive a male contact member, the device comprising a folded sheet metal generally U-shaped member having a bight portion and arms extending from the bight portion. The arms have opposed internal surfaces, oppositely facing external surfaces, and aligned distal ends. The internal and external surfaces are the rolled surfaces of the stock metal from which the device was produced or formed. The spacing between the internal surfaces is less than the thickness of the male contact member. The device has opposite ends and the bight portion and the arms extend between the ends. The receptacle portion comprises a contact receiving opening in the bight portion which is between, and spaced from, the opposite ends. The bight portion is plastically deformed and work hardened and the arms are resiliently deformable in directions which extend normal to the planes of the arms so that upon insertion of a male contact member into the contact receiving opening or receptacle portion, the opposed internal surfaces are urged apart by the contact member and the arms are bowed in the vicinity of the receptacle portion by the contact member thereby to establish electrical contact between the inserted contact member and the connecting device. At least one contact site can be provided on the distal ends of the arms, the ends which are remote from the bight, which is intended to receive another contact member that is dimensioned to be coupled to the arms at the connecting site upon movement of the second contact member onto at least one of the arms, the movement being in a direction extending parallel to the arms and towards the bight. The contact site may comprise aligned slots extending inwardly from the distal ends of the arms towards the bight.

In a preferred embodiment, the arms are in parallel planes and each of the arms is severed along two severed lines which extend from the opening partially towards the distal ends of the arms. The severed lines define an ear in each arm which has a free end and a fixed end, the free end being proximate to the opening and the fixed end being integral with, and extending from, the associated arm at a location which is between the opening and the distal end of the arm. The ears extend divergently from their fixed ends to their free ends whereby the ears have opposed convergent surfaces which serve as guiding surfaces for the male contact member.

In one embodiment of the invention, the internal surfaces of the arms are substantially or actually against each other while in an alternative embodiment, the arms are in parallel spaced apart planes. The bight portion, in one embodiment, has a thickness which is greater than the combined thicknesses of the two arms and the bight portion is connected to the arms by transition sections which extend from the bight portion to the arms. In an alternative embodiment, the bight portion is semi-circular and the arms extend directly (i.e., tangentially) from the bight portion so that they are in parallel spaced apart planes.

The connecting device may take the form of an elongated bus bar which has a plurality of receptacle portions and at least one contact site on the distal ends of the arms. The contacting device, which is coupled to the distal ends may have a wire-receiving slot so that the contact device can be electrically connected to a conductor, such as a service conductor, by moving the conductor laterally of its axis and into the slot.

THE DRAWING FIGURES

FIG. 13 is a plan view of the blank from which the bus bar of FIG. 1 is formed.

THE DISCLOSED EMBODIMENTS

Referring to FIGS. 1-6, a bus bar 2 in accordance with the invention comprises a folded section of sheet metal, such as cold rolled brass, having a bight 4 and arms 6 which extend from the bight portion. The arms have distal ends 12 and are connected to the bight by transition sections 14 which extend from the semi-circular bight convergently so that they merge with the arms. The arms have oppositely facing external surfaces 8 and opposed internal surfaces 10, the surfaces 8, 10, being the rolled surfaces of the metal from which the bus bar was formed.

Figures 1, 5:
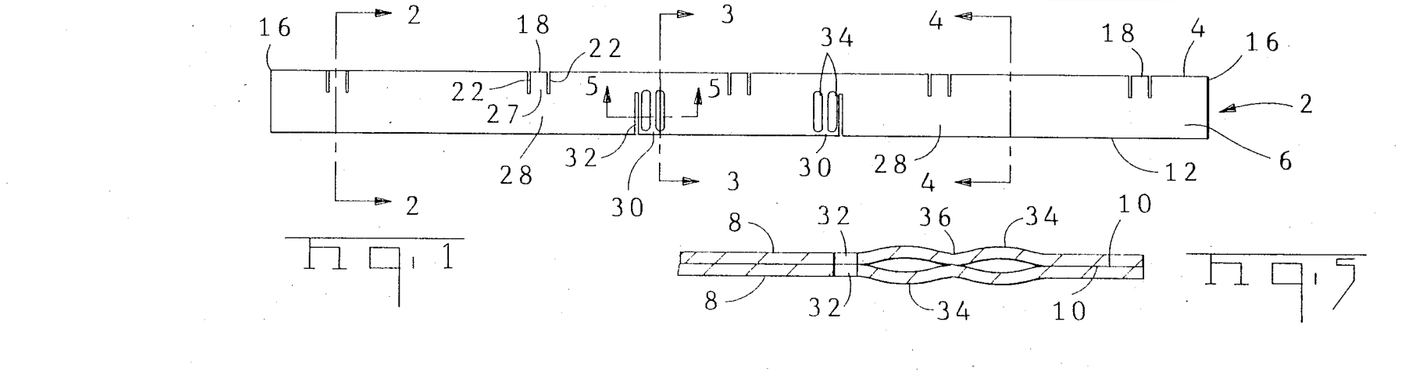
FIG. 1 is a frontal view of a bus bar in accordance with the invention.
FIGS. 2, 3, 4, and 5 are sectional views looking in the directions of the arrows of the correspondingly numbered section lines in FIG. 1.
Figures 2, 3, 4:
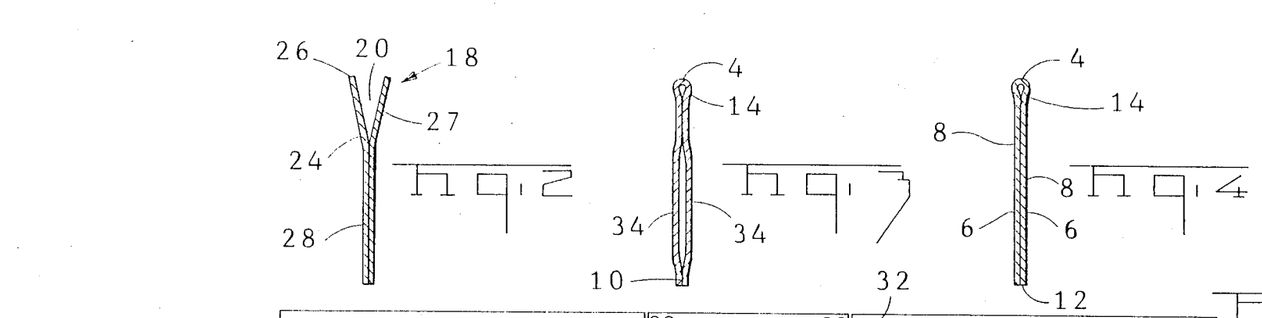
Figure 6:
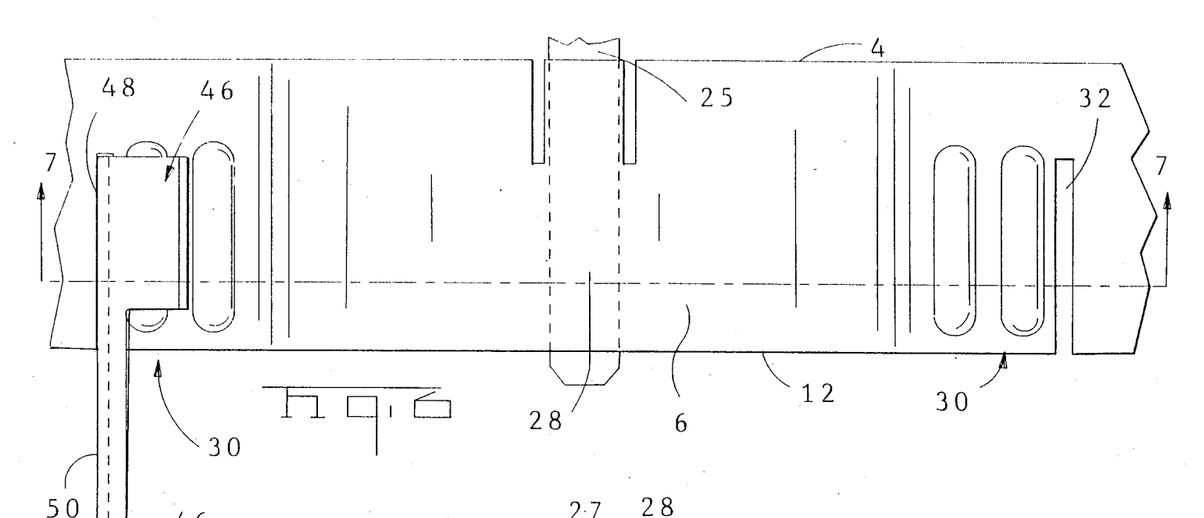
FIG. 6 is a view, on an enlarged scale, showing a section of the bus bar and showing an inserted terminal tab member and a contact member coupled to the bus bar.

A plurality of receptacle portions 18 are formed in the bight between the opposite ends 16 of the bus bar. Each receptacle portion 18 comprises an opening 20 in the bight which is defined by severed lines 22 which extend from the opening partially towards the distal ends of the arms. Each arm thus has a tab 27 which is between the severed lines, each tab having a fixed or inner end 24 that is between the bight and the ends of the arm and a free outer end 26 which is proximate to the opening 20. The tabs or ears 27 extend divergently from their fixed ends and provide a lead-in surface for a tab terminal member 25 when it is inserted into the opening. Each arm also has a section 28 which is between the fixed end of the associated ear 27 and the distal end of the arm. These sections will bow when deflected as will be described below when the male contact member 25 is inserted into the receptacle portion. The male contact member 25 will ordinarily be connected to a second conductor which extends from the bus bar and the bus bar will also be connected in use to a first conductor by a contact member described below.

At least one contact site 30 is provided on the distal ends of the arms. This contact site comprising aligned slots 32 which extend inwardly from the ends of the arms towards the bight. A pair of outwardly formed embossments 34 are provided in the arms adjacent to the associated slot 32 so that a depression 36 is provided between these embossments for cooperation with a terminal or contact member 46 described below.

The bus bar 2 is formed from a stamped blank 2', FIG. 13. The openings at the receptacle sites and the severed lines are produced by punching parallel openings 22 in the blank and severing the blank along a shear line 38. The openings 22 could also be produced by shearing; however, it is preferable to actually punch out material so that the ears or tabs 27 in the formed bus bar will not engage adjacent sheared edges and will flex in a predictable manner when the male contact member 25 is inserted into the associated opening.

Figure 14:
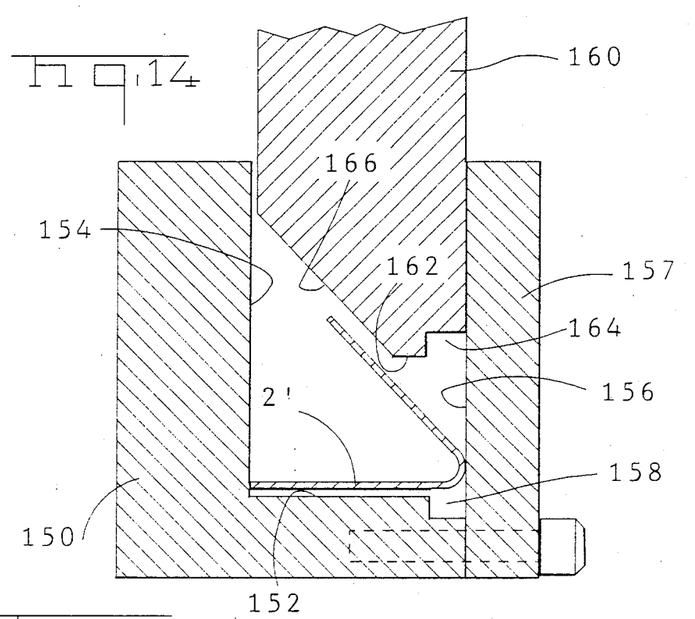
FIGS. 14 and 15 are views which illustrate the manner of forming the bus bar from the blank of FIG. 13.
Figure 15:
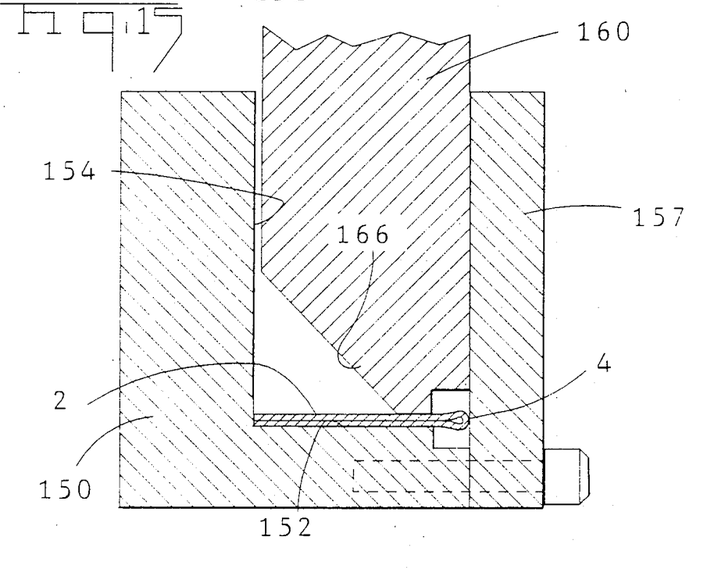
Figures 16, 17, 18, 19, 20:
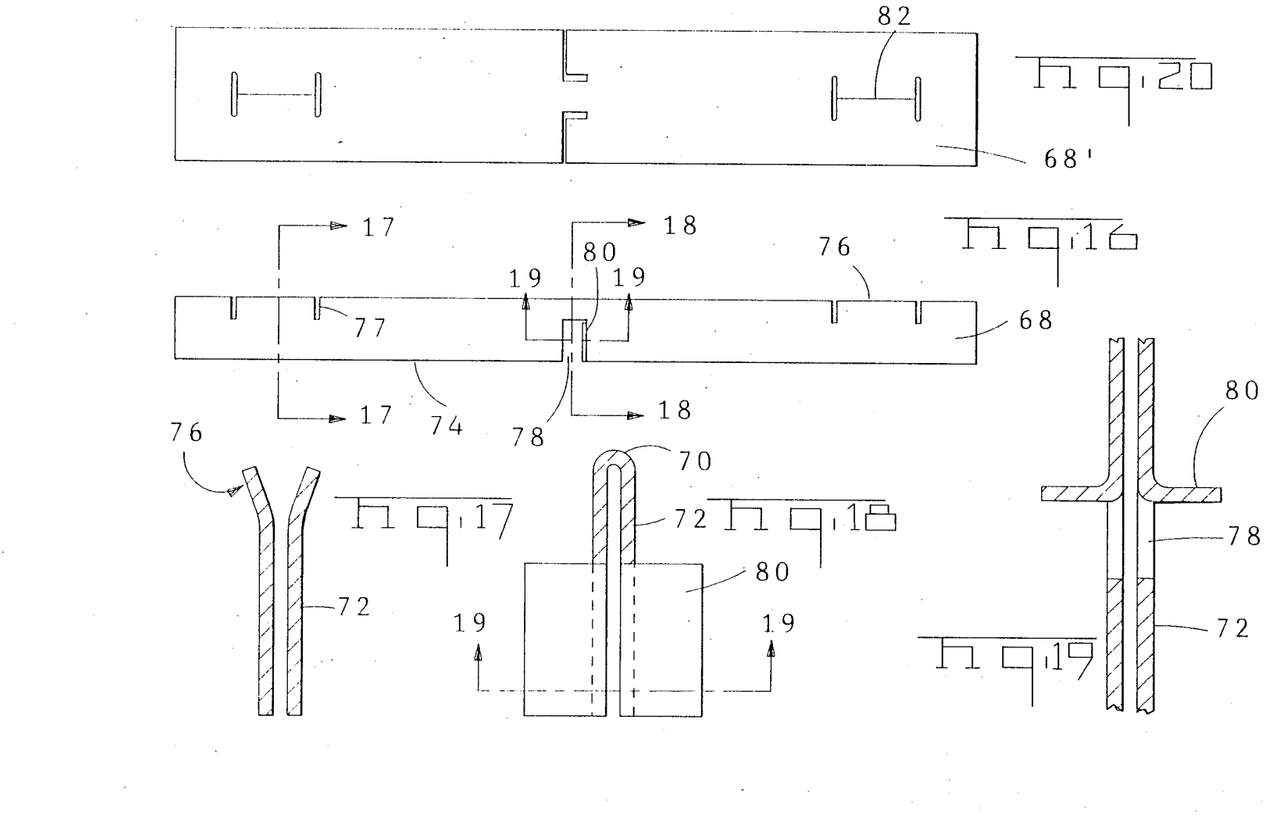
FIG. 16 is a frontal view of an alternative embodiment.
FIGS. 17, 18, and 19 are sectional views looking in the directions of the correspondingly numbered arrows in FIG. 16.
FIG. 20 is a plan view of the blank from which the bus bar of FIG. 16 is formed.

The blank 2' is folded by means of tooling, FIGS. 14 and 15, which produces severe work hardening in the bight portion. The fixed forming tool 150 has a horizontal surface 152 on which the blank 2', which has been partially folded, is placed. A plate 157 is secured to the face of the block 150 and has a vertical surface 156 which is spaced from the vertical surface 154 of tooling block 150 by a distance which is equal to the distance between the bight and the distal ends of the arms in the formed bus bar. The movable forming tool 160 has a flat surface portion 162 on its lower end which adjoins an inclined portion 166. Opposed recesses 158 and 164 are provided in the surface 152 and on the end of the movable tool 160 respectively, these recesses being adjacent to the surface 156.

When the movable tool is moved downwardly from the position of FIG. 14 to the position of FIG. 15, the sidewalls of the blank will be moved against each other and the bight will be formed in the cavity which is between the opposed recesses 158, 164. Because of the fact that the workpiece is confined during this operation, the bight portion is coined against the surface 156 and severely work hardened. As a result, the internal surfaces of the sidewalls are held against each other with no spring back and the bight becomes a stiff spring which maintains the opposed surfaces against each other.

The contact member 46, FIGS. 9-12, which is coupled to the contact site on the distal ends of the arms is a stamped and formed doubled ended contact member having one end 48 which is coupled to the bus bar and another end 50 which has a wire-receiving slot. The contact member has a base or web 52 which extends from the end 48 substantially to the end 50 and has sidewalls 54 extending from the base. These sidewalls have inwardly formed outer ends 56 which are received in the depressions 36 between the adjacent embossments at the contact sites. The intermediate portion 58 of the contact member has relatively low sidewalls or flanges 60 and the wire-receiving slot 62 extends inwardly from the end 50. The base portion is tapered to points 64 at the entrance to the slot and the side flanges 60 are inclined downwardly towards the base as shown at 66 to facilitate penetration of an insulated conductor by the contact member when it is connected to a conductor in a cable or the like as described below.

FIGS. 16-20 show an alternative embodiment 68 which is produced of a relatively heavier gauge sheet metal than the previously described embodiment and which is intended for use with 110 volt power supply conductors or the like. The bus bar 68 has a semi-circular bight 70 and arms 72 which extend directly from the bight and which are spaced apart. Receptacle sites 76 are provided in the bight as previously described and are defined by punched openings 77. The contact site 78 on the distal ends 74 of the arms 72 has a relatively wide slot in each arm and has flanges or ears 80 extending from each arm beside each slot. The bus bar 68 is formed from a blank 68' as previously described so that the arms are set in their spaced apart positions and are stiffly flexible. The tooling used to form bus bar 68 would not have the recesses 158, 164 and a shim would be used to produce the clearance between the opposed surfaces of sidewalls 72.

Figures 21, 23:
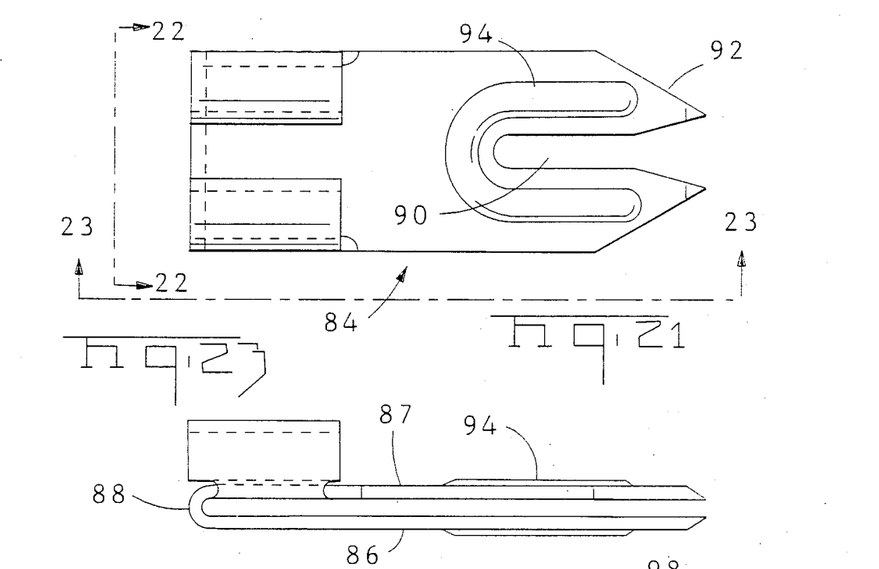
FIG. 21 is a frontal view of a contact device or terminal which is intended to be coupled to the bus bar shown in FIG. 16 at a contact site on the distal ends of the arms.
FIGS. 22 and 23 are views looking in the direction of the arrows 22—22 and 23—23 of FIG. 21.

The terminal 84, FIG. 21, which is coupled to the bus bar at the contact site has aligned plate-like sections 86, 87 which are connected to each other at their upper ends by a fold 88. Wire-receiving slots 90 extend upwardly as viewed in the drawing from the lower ends from the sections 86, 87 and the plate-like sections are also embossed as shown at 94 to enhance the stiffness of the plate sections in the vicinities of the slots. The plate sections are tapered towards each other as shown at 92 to facilitate penetration of the cable.

Figures 22, 24, 25:
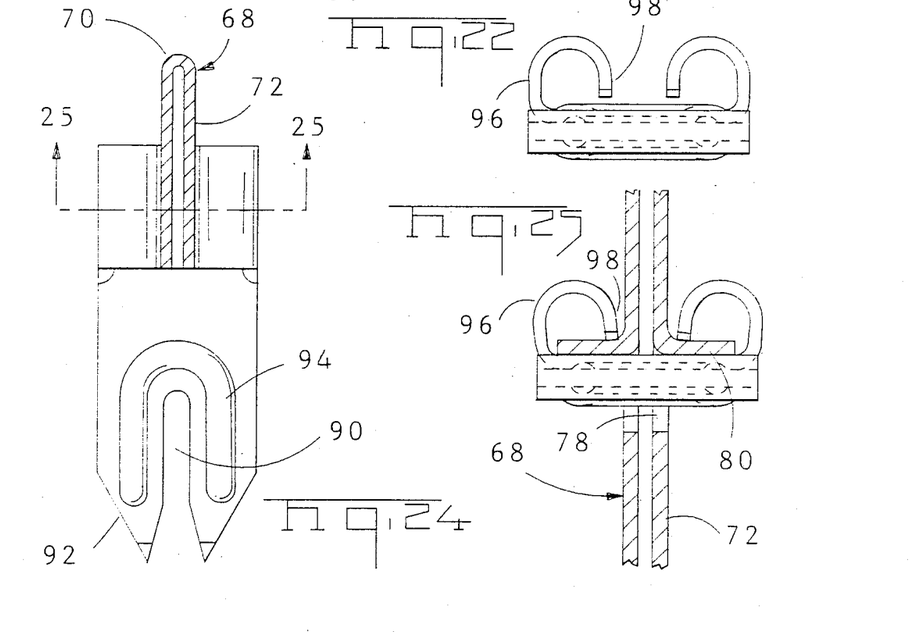
FIG. 24 is a sectional view showing the bus bar of FIG. 16 and showing the terminal of FIG. 21 coupled to the bus bar.
FIG. 25 is a view looking in the direction of the arrows 25—25 of FIG. 24.

A pair of ears 96 extend from the side edges of the plate section 87 adjacent to the fold 88 and these ears are reversely curled inwardly towards each other so that their ends 98 are spaced from the surface of the plate section 87. The terminal 84 is coupled to the bus bar at the contact site by movement of the two plate sections 86, 87 into the enlarged and relatively wide slots. The flanges 80 are received between the ends of the reversely curled ears 96 and the surfaces of the flanges 80 as shown in FIG. 25.

Figure 28:
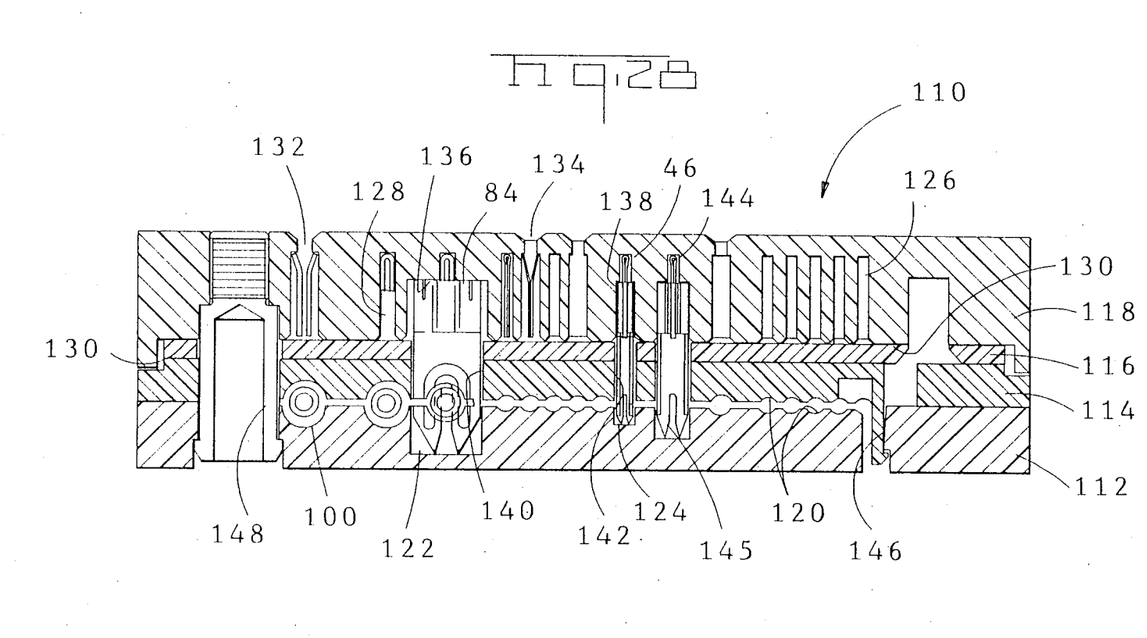
FIG. 28 is a sectional view of a housing assembly which contains a plurality of bus bars, contact terminals, and an electrical cable.

Bus bars of the type described above are particularly intended for use in a cable tap assembly 110 shown in FIG. 28. The cable tap assembly contains a cable 100 which comprises a plurality of conductors 102 and 104, the conductors 102 being relatively heavy gauge wires, for example AWG12, intended for power supply and the conductors 104 being of a relatively fine gauge, for example AWG24, and are intended for signal transmission. The conductors are all contained in insulating material 106 as shown in FIG. 26.

Figure 26:
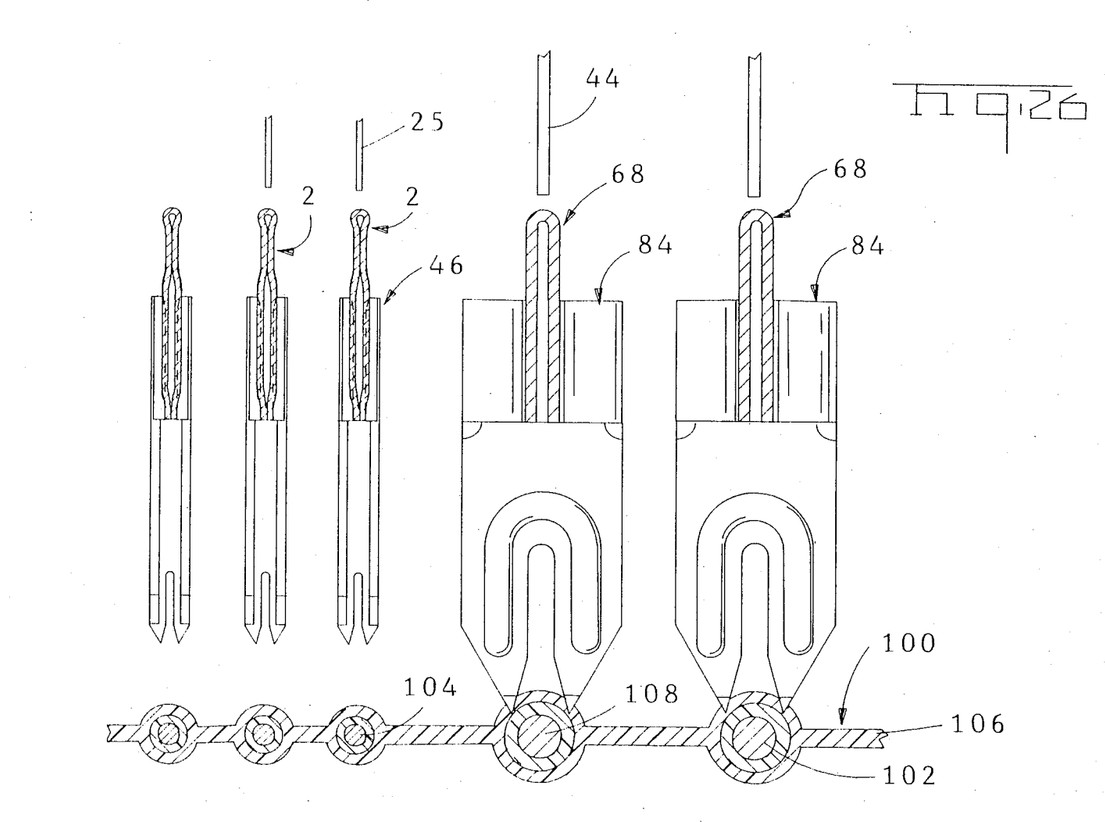
FIG. 26 is a sectional view showing both of the types of bus bars with terminals on their distal ends and showing an electrical cable having conductors in alignment with the wire-receiving slots of the contacting devices which are on the distal ends of the bus bars.

FIG. 26 shows two bus bars 68 and three bus bars 2 which are in alignment with conductors 108 and 104. The bus bars 2 have contact members 46 on their lower ends and the bus bars 68 have contact members 84 coupled to their lower ends. It will be apparent from FIG. 26 that if the bus bars and the contact members are moved downwardly from the positions shown, the lower ends of the contact members will penetrate the cable and the conductors will be received in the wire-receiving slots of the contact members so that electrical contact will be established with the individual conductors. Each of the bus bars will have a plurality of receptacle portions in its bight portion and tap contact members 25, 44 are shown in positions so that they can be moved downwardly and electrically connected to the bus bars.

The cable tap assembly 110, FIG. 28 comprises a housing assembly which consists of lower and upper clamping sections 112, 114, and intermediate relatively firm insulating plate member 116, and a top section 118. The opposed surfaces of the cable clamping sections 112, 114 have cable locating surfaces as shown at 120 so that when the parts are assembled to each other, the individual conductors will be held in precisely determined locations. The section 112 has recesses 122, 124 which are dimensioned to receive the lower ends of the contact members 46, 84 when the parts are assembled to each other with the cable clamped between the opposed surfaces 120. The top section 118 has a plurality of aligned slots 126, 128 for the two types of bus bars described above. These slots extend inwardly from the lower surface 130 of the top section 118 and the bus bars can be assembled to the top section by placement thereof in their respective slots. Openings 132 extend into the top section from the upper surface thereof to the receptacle sites so that the tab receptacles can be moved downwardly into mating relationship with the bus bars. Additionally, enlarged recesses 136, 138 extend inwardly from the lower surface 130 for the reception of the terminals which are engaged with the bus bars. Passageways 140, 142 extend through the intermediate plate 116 and the upper cable clamping section 114 for the accommodation of the intermediate portions of the contact members as shown in FIG. 28.

The sections 112-118 of the assembly of FIG. 28 are held in assembled relationship by suitable fasteners indicated at 148. The two cable clamping sections 112, 114 are coupled to each other, prior to their assembly to the upper housing sections by latch arms shown at 146. The tap assembly 110 shown in FIG. 8 is also designed to accept a bus bar 144 of intermediate size between the two bus bars described above. This intermediate size bus bar has terminals 145 as described above and in the assembly shown is intended for use with auxiliary power supply circuits such as 24 volt DC circuits which extend from storage batteries and which function to maintain vital control circuits in the event of a failure of the 110 volt service.

Figures 7, 8:
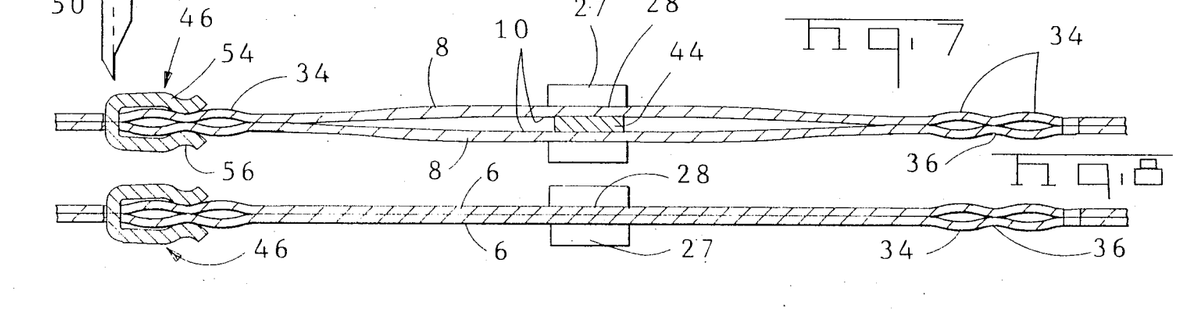
FIG. 7 is a sectional view looking in the direction of the arrows 7—7 of FIG. 6.
FIG. 8 is a view similar to FIG. 7 but showing the positions of the parts, particularly the arms, of the bus bar prior to insertion of the tab contact member into the receptacle site.
Figure 9:
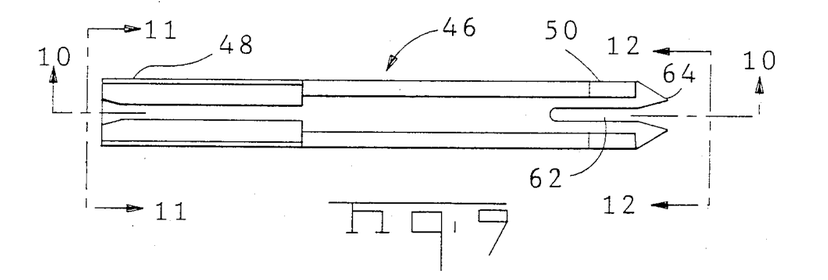
FIG. 9 is a frontal view of a contact member which is mateable with the bus bar at a contact site on the distal ends of the arms.
Figure 10:
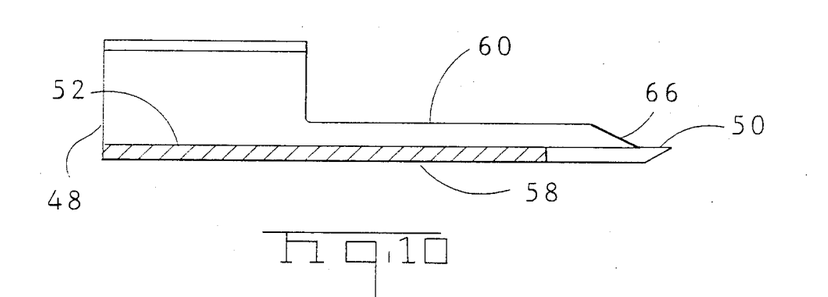
FIGS. 10, 11, and 12 are views looking in the direction of the correspondingly numbered arrows in FIG. 9.
Figure 11:
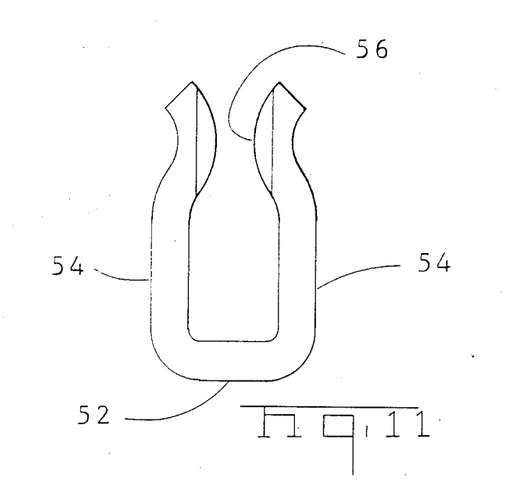
Figure 12:
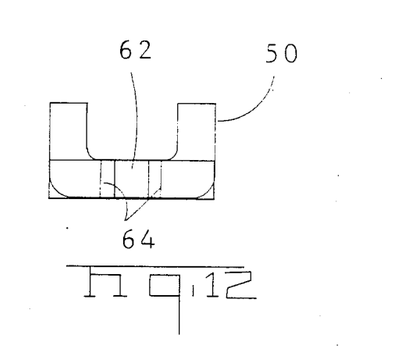

Several advantageous results are achieved in the use of bus bars in accordance with the invention. One distinct advantage resides in the manner in which the arms are resiliently deformed when a male contact tab 25 is inserted into a receptacle portion of a bus bar. As shown in FIG. 7, the portions of the arms on each side of an inserted contact member 25 or 44 are bowed outwardly so that the contact arms engage the inserted contact member on its four corners and on surface portions of the male contact members adjacent to the corners. The contact area is thus extensive and redundant. The bus bar is preferably designed so that the deformation illustrated in FIG. 7 is resilient or elastic deformation rather than plastic deformation with the result that the contact force will be maintained at all times by virtue of the tendency of the arms to return to their normal positions as shown in FIG. 8. The actual magnitude of the contact forces opposed on the inserted tab member can be relatively high if desired and can be controlled by the designer if it is preferred to reduce contact forces in order to reduce insertion forces. The insertion force or contact force can be reduced, for example, by simply increasing the distance between the severed lines 22 in FIG. 1 and thereby increasing the width of the zone 28. The arms are maintained in engagement with the tab by portions of the bight on each side of the receptacle portion. These cold worked portions act as extremely stiff C-shaped springs and oppose the tendency of the inserted tab to separate the arms.

While much of the contact force exerted on the inserted tab will result from the bowing effect shown in FIG. 7, some of the contact force will result from the fact that adjacent portions of the arms are forced apart in the manner of a cantilever beam which is deflected by imposing a lateral force on an end portion of the beam. The total contact force can be regulated as discussed above. The mechanical properties, and therefore the normal force, can also be regulated by changing the temper of the material used, the composition of the material, and the thickness of the stock metal from which the bus bar is formed.

Bus bars in accordance with the invention can be placed adjacent to each other as shown in FIG. 28 when it is necessary to make tap connections to the electrical cable. An arrangement of the type shown in FIG. 28 can also be used in a junction box where cross-connections are to be made between a plurality of incoming conductors. Under such circumstances, the cable may or may not be present in the junction box.

Figure 27:
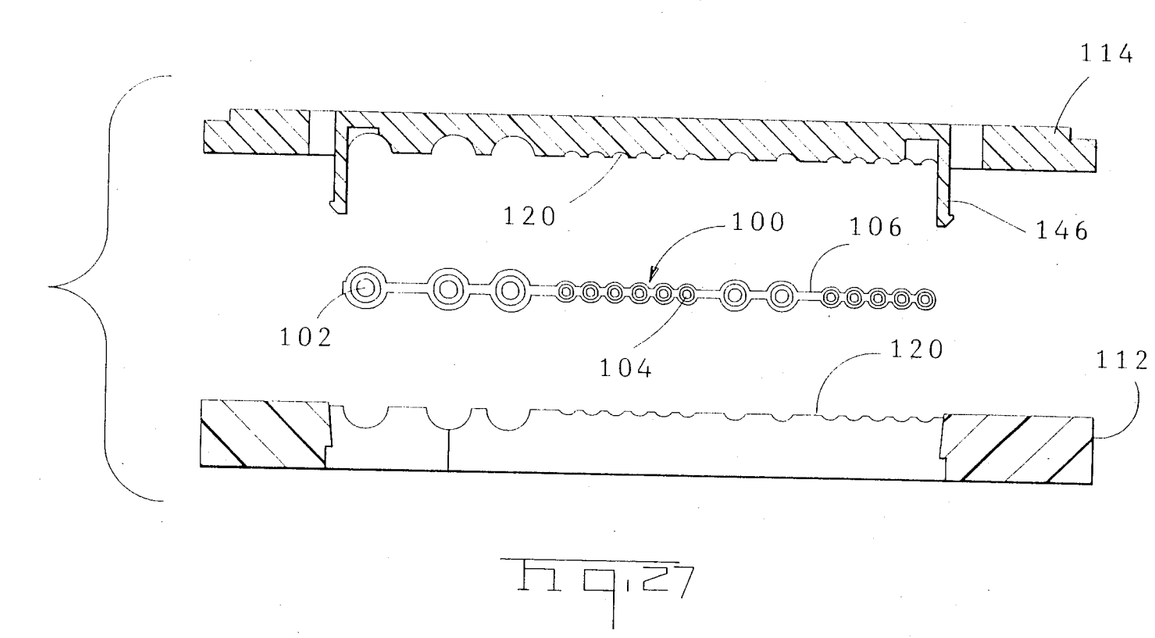
FIG. 27 is a sectional view showing an electrical cable and two cable clamp sections.

Under some circumstances, it may become necessary to splice the corresponding conductors of two cables 100 to each other. Such splice connections can be made by simply placing the ends of the two cables between cable clamping members as shown in FIG. 27 and connecting the ends of aligned conductors in the cable by contact members on the distal ends of the arms. The bus bar 2 shown in FIG. 1 does, in fact, have two contact sites on the distal ends of its arms and can be used for making spliced connections between corresponding conductors in cable ends. Where the bus bar is used for making tap connections, only one connection need be made to the cable conductor, although a second connection to the same conductor might be made for purposes of redundancy.

We claim:

1. An electrical connecting device having at least one receptacle portion opening which is intended to receive a male contact member, the connecting device comprising:
    a folded sheet metal generally U-shaped member having a bight portion and arms extending from the bight portion, the arms having opposed internal surfaces, oppositely facing external surfaces, and distal ends, the internal and external surfaces being rolled surfaces, the spacing between the internal surfaces being less than the thickness of the male contact member, said arms lying in parallel planes and each of the arms is severed along two severed lines which extend from the opening partially towards the distal ends of the arms, the severed lines defining an ear in each arm having a free end which is proximate to the opening and a fixed end which is integral with, and extends from, the associated arm at a location between the opening and the distal end, the ears extending divergently from their fixed ends to their free ends whereby the ears have opposed convergent surfaces which serve as guiding surfaces for the male contact member,
    the connecting device having opposite ends, the bight portion and the arms extending between the opposite ends, the receptacle portion comprising said contact receiving opening in the bight portion, the opening being between, and spaced from, the opposite ends,
    the bight portion being plastically deformed and work hardened, the arms being resiliently deformable in directions which extend normal to the planes of the arms whereby,
    upon insertion of the male contact member into the contact receiving opening, the opposed internal surfaces are urged apart by the male contact member and the arms are bowed in the vicinity of the receptacle portion by the male contact member whereby electrical contact between the male contact member and the connecting device is established and maintained.

2. An electrical connecting device as set forth in claim 1 characterized in that the severed lines are punched openings in the arms.

3. An electrical connecting device as set forth in claim 1 characterized in that the arms are in substantially parallel spaced-apart planes and the bight has a substantially semi-circular cross-section.

4. An electrical connecting device as set forth in claim 1 characterized in that the arms are in substantially parallel planes and the opposed internal surfaces of the arms are substantially against each other, the bight having a thickness, as measured in a direction normally of the planes of the arms, which is greater than the combined thicknesses of the two arms, the bight having a substantially semi-circular portion, as viewed in cross-section, and transition portions which extend convergently from the semicircular portion and which merge with the arms.

5. An electrical connecting device as set forth in claim 1 characterized in that the device is an elongated bus bar and has a plurality of receptacle portions.

6. An electrical connecting device as set forth in claim 5 characterized in that the bus bar has at least one contact site on the distal ends of the arms, the contact site being intended to receive another contact member which is dimensioned to be coupled to the arms at the connecting site upon movement of the other contact member onto the arms in a direction extending parallel to the arms and towards the bight.

7. An electrical connecting device as set forth in claim 6 characterized in that the contact site comprises aligned slots extending inwardly in the arms from the distal ends thereof towards the bight.

8. An electrical bus having a plurality of receptacles which are intended to receive a male contact member, the bus comprising:
    a folded electrically conductive member having a bight portion and walls extending from the bight portion, the walls having opposed internal surfaces and free ends which are spaced from the bight portion, the spacing between the internal surfaces being less than the thickness of a male contact member to be inserted therebetween,
    the bus having opposite ends, the bight portion and the walls extending generally between the opposite ends, the receptacles comprising contact receiving openings in the bight portion, each opening being between and spaced from the opposite ends, the bight portion being continuous between adjacent openings, where each said opening extends in each wall away from the bight for a first distance, less than the spacing between the bight and the free ends, the deflection of the walls upon insertion of a male contact in said receptacle opening being substantially confined to bowing of the walls between the first distance and the free ends, the folded electrically conductive member being shaped so that the folded electrically conductive member is more rigid in planes transverse to the bus through the bight than in longitudinal planes between the opposite ends containing the walls so that the walls of the bus bow relative to the longitudinal planes upon insertion of a male contact member through said receptacle openings between the walls.

9. An electrical bus having a plurality of receptacles which are intended to receive a male contact member, the bus comprising:

a folded electrically conductive member having a bight portion and walls extending from the bight portion, the walls having opposed internal surfaces and free ends which are spaced from the bight portion, the spacing between the internal surfaces being less than the thickness of a male contact member to be inserted therebetween, the bus having opposite ends, the bight portion and the walls extending generally between the opposite ends, the receptacles being defined by a pair of slots extending into each wall from bight portion, each slot having a depth less than the spacing between the bight and the free ends, the bight portion being discontinuous between each pair of slots, each receptacle being spaced from the opposite ends, the bight portion being continuous between adjacent receptacles, the depth of the slots being sufficient that the majority of the deflection of the bus upon insertion of a male contact into a receptacle comprises bowing of the walls in the longitudinal direction, the walls being substantially undeflected from the bight to a depth substantially equal to the depth of the slots.

10. An elongated bus bar having a contact site which is intended to receive a first contact member and a plurality of receptacle portions which are intended to receive second contact members in the form of male contact members, the bus bar comprising:

a folded sheet metal generally U-shaped member having a bight portion and arms extending from the bight portion, the arms being in parallel planes, the arms having opposed internal surfaces, oppositely facing external surfaces, and distal ends, the internal and external surfaces being rolled surfaces, the spacing between the internal surfaces being less than the thickness of one of the male contact members, the bus bar having opposite ends, the bight portion and the arms extending between the opposite ends, each of the receptacle portions comprising a contact receiving opening in the bight portion, the openings being between the opposite ends and being spaced apart, each of the arms being severed at each opening along two severed lines which extend from the associated opening partially towards the distal ends of the arms, the severed lines defining an ear in each arm having a free end which is proximate to the associated opening and a fixed end which is integral with, and extends from, the associated arm at a location between the opening and the distal end of the arm, the ears extending divergently from their fixed ends to their free ends, the contact site for the first contact member being on the distal ends of the arms, the first contact member being dimensioned to be coupled to the arms at the contact site upon movement of the first contact member onto the arms in a direction extending parallel to the arms and towards the bight.

11. An elongated bus bar as set forth in claim 10 characterized in that the severed lines are punched openings in the arms.

12. An elongated bus bar as set forth in claim 10 characterized in that the contact site comprises aligned slots extending inwardly in the arms from the distal ends thereof towards the bight.

13. An elongated bus bar as set forth in claim 10 characterized in that the bight has a substantially semi-circular cross-section.

14. An elongated bus bar as set forth in claim 10 characterized in that the opposed internal surfaces of the arms are substantially against each other, the bight having a thickness, as measured in a direction normal to the planes of the arms, which is greater than the combined thicknesses of the two arms, the bight having, as viewed in cross-section, a substantially semi-circular portion and transition portions which extend convergently from the semi-circular portion and which merge with the arms.

15. An elongated bus bar as set forth in claim 13 characterized in that the bight portion is plastically deformed and work hardened so that the bight portion maintains the arms in their parallel planes, the arms having resiliently deformable portions which are between the fixed ends of the ears and the distal ends of the arms whereby the resiliently deformable portions are bowed outwardly upon insertion of a male contact member.

16. An elongated bus bar as set forth in claim 15 wherein portions of each arm which are adjacent to the one receptacle portion functioning to restrain the arms against movement away from each other thereby causing the resiliently deformable portion to be bowed upon insertion of male contact member.

17. An elongated bus bar as set forth in claim 16 characterized in that the contact site comprises a pair of aligned slots extending inwardly in the arms from the distal ends thereof towards the bight and the first contact member has a bus bar mating portion which extends into the aligned slots.

18. An elongated bus bar as set forth in claim 17 characterized in that the bus bar mating portion of the first contact member has a web which is received in the aligned slots and sidewalls extending from the web over adjacent portions of the external surfaces of the arms, the sidewalls having portions which are resiliently biased against the external surfaces.

19. An elongated bus bar as set forth in claim 17 characterized in that the arms having integral flaps which are beside the slots, the flaps extending normally of the external surfaces of the arms and parallel to the slots, the first contact member having integral spring members which are in engagement with the flaps.

20. An elongated bus bar as set forth in claim 17 wherein at least one embossment in each sidewall extends adjacent to an associated slot.

21. An elongated bus bar as set forth in claim 17 characterized in that the first contact member is a double-ended contact member having a contact portion at each end, the contact portion at one of the ends being the bus bar mating portion, the contact portion at the other end being adapted to establish electrical contact with a further conductor.

22. An elongated bus bar as set forth in claim 21 characterized in that the contact portion at the other end of the first contact member is a wire-receiving slot which extends inwardly from the other end.

* * * * *